United States Patent [19]

Diskus et al.

[11] 3,886,155
[45] May 27, 1975

[54] 3-PHENYL-4;5-DICHLORO PYRIDAZINYL ALKANOATES

[75] Inventors: Alfred Diskus, Linz/Danube; Rupert Schönbeck, Leonding near Linz/Danube; Engelbert Kloimstein, Eferding; Hubert Mayr, Leonding near Linz/Danube, all of Austria

[73] Assignee: Osterreichische Stickstoffwerke, Linz/Danube, Austria

[22] Filed: June 1, 1973

[21] Appl. No.: 366,017

[30] Foreign Application Priority Data
June 19, 1972  Germany............................ 2229758

[52] U.S. Cl................................. 260/250 A; 71/92
[51] Int. Cl.............................................. C07d 51/04
[58] Field of Search............................... 260/250 A

[56] References Cited
UNITED STATES PATENTS
3,790,571   2/1974   Diskus et al. ................... 260/250 A FOREIGN PATENTS OR APPLICATIONS
1,083,901   9/1967   United Kingdom............. 260/250 A
41-20707   12/1966   Japan.............................. 260/250 A Primary Examiner—Richard J. Gallagher
Assistant Examiner—Ralph D. McCloud
Attorney, Agent, or Firm—Wenderoth, Lind & Ponack

[57] ABSTRACT

New phenylpyridazines of the general formula

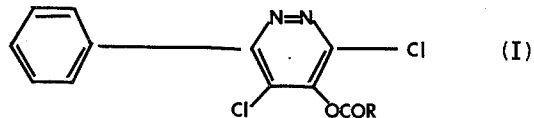

in which R is alkyl containing 1 to 20 carbon atoms, β-chloroethyl or phenyl, which have valuable herbicidal properties.

8 Claims, No Drawings

3-PHENYL-4;5-DICHLORO PYRIDAZINYL ALKANOATES

This invention relates to phenylpyridazines and to a process for the preparation thereof. The invention is also concerned with herbicidal compositions containing such compounds.

It has been known for some time that pyridazine derivatives can influence the growth of plants (see Austrian Pat. No. 198,997). Austrian Pat. No. 237,962 discloses 3,6-dichloro-4-hydroxypyridazine as a selective agent for combating weeds. This compound is prepared by the partial saponification of 3,4,6-trichloropyridazine. 3,4,6-Trichloro-5-alkoxypyridazines, which also possess valuable herbicidal properties, may be prepared, according to Austrian Pat. No. 285,618, by the reaction of 3,4,5,6-tetrachloropyridazine with alkali metal alcoholates.

The present invention provides phenyl-pyridazines of the general formula

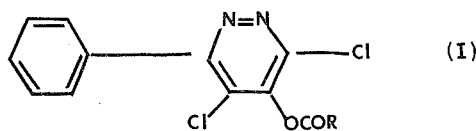

in which R is alkyl containing 1 to 20 carbon atoms, β-chloroethyl or phenyl.

It has been found that these compounds of formula (I) possess valuable herbicidal properties coupled with good toleration by crop plants, and that their action starts rapidly.

The present invention also provides a process for the preparation of a phenylpyridazine having the general formula (I) herein, which comprises reacting 3-phenyl-4,6-dichloro-5-hydroxypyridazine with a reactive derivative of an organic acid having the formula

in which R is as defined above. The reaction of the hydroxypyridazine compound with an appropriate acid chloride of the formula ClCOR succeeds particularly advantageously by simply melting the compounds together and heating them to an elevated temperature, whereupon hydrochloric acid is evolved and the desired ester is obtained in good yield.

The use of an acid-binding agent, of a catalyst or of a solvent is not necessary in the above case but may be advantageous in some cases. The anhydrides of the acids of formula (II) are also very suitable starting materials. Here again, simple mixing and heating of the reactants suffices. The compounds of formula (I) are viscous oils which are soluble in the customary organic solvents. They are obtained from the reaction mixture as an evaporation residue after removing the excess acid derivative, taking up the product in an organic solvent, filtering the solution and evaporating the solvent. The compound of formula (I) are neutral and are in general only very sparingly soluble in water.

3-Phenyl-4,6-dichloro-5-hydroxypyridazine, employed as the starting substance for the preparation of the compounds according to the invention, is also a new compound and forms colourless crystals of melting point 294° to 300°C, with decomposition. It may be obtained from 3-phenyl-4,5,6-trichloropyridazine (melting point 121° to 122°C) by reaction with sodium hydroxide solution. 3-Phenyl-4,5,6-trichloropyridazine is obtainable by reaction of the known 3-phenyl-4,5-dichloropyridazone-(6) (Dury, Angew, Chemie, Year 77 (1965), No. 7, page 284) with phosphorus oxychloride.

The present invention further provides a herbicidal composition for the selective combating of weeds in crop plantings, which comprises, as the active ingredient, one or more compounds of general formula (I) herein, either alone or admixed with one or more inert solid and/or liquid extenders or diluents and/or wetting agents and, optionally, insecticides, growth regulators and/or plant nutrients.

The active compounds according to the invention are compounds which are taken up by the leaves of the weeds and the action of which is therefore independent of both the nature of the soil and the moisture content of the soil. Since these compounds do not act in the sense of growth substances, the danger of damage to adjoining crops by drift of a mist of active substance is very substantially reduced.

The herbicidal compositions according to the invention may be in the form of dispersions or emulsions, in the form of a pulverulent preparation or in the form of granules. Of course, a combination with other herbicidal active substances is also possible, and a conjoint application of insecticides, growth regulators or plant nutrients has also proved of value. For compositions in the form of aqueous dispersions or emulsions, it is advisable to add a dispersing agent, such as, for example, sodium oleyl-methyl-tauride. Possible solid extenders are, inter alia, different varieties of clay, for example kaolin.

It is advantageous to combine the compounds according to the invention with non-phytotoxic oil, for example a mineral oil-emulsifier mixture consisting of a paraffinic mineral oil and an emulsifier.

The herbicidal action may be further increased by adding such a "spray oil" to a spraying solution containing a compound according to the invention. Such combinations usually contain 1 to 10 kg. of the active compound according to the present invention and 1 to 10 litres of a non-phytotoxic oil, distributed in 50 to 1,000 litres of water.

The following Examples illustrate the preparation of compounds according to the invention and the use of herbicidal compositions containing them.

EXAMPLE 1

5.0 g of 3-phenyl-4, 6-dichloro-5-hydroxypyridazine were mixed with 20 g of n-butyric acid chloride and boiled for 10 hours under a reflux condenser. The excess butyric acid chloride was distilled off in vacuo and the oily residue was dissolved in 50 ml of petroleum ether, filtered using active charcoal, and again evaporated. 4.8 g. of 3-phenyl-4,6-dichloro-pyridazinyl-(5) n-butanoate were left as a yellow oil, corresponding to 74% yield.
$n_D^{20} = 1.5665$

| | | | |
|---|---|---|---|
| C calc. 53.69% | H calc. 4.51% | N calc. 8.95% | Cl calc. 22.53% |
| found 54.0 % | found 4.5 % | found 8.8 % | found 22.2 % |
| O calc. 10.22% | | | |
| found 10.5 % | | | |

EXAMPLE 2

5.0 g of 3-phenyl-4,6-dichloro-5-hydroxypyridazine and 20 g of 2-ethylhexanoic acid chloride were boiled for 30 minutes under a reflux condenser. The excess acid chloride was distilled off in vacuo and the residue was dissolved in 50 ml of petroleum ether, filtered using active charcoal and evaporated. 6.8 g of 3-phenyl-4,6-dichloro-pyridazinyl-(5) 2'-ethylhexanoate were left as a yellow oil, corresponding to 89.5% yield.
$n_D^{20} = 1.5500$

| | | | |
|---|---|---|---|
| C calc. 58.68% | H calc. 5.49% | N calc. 7.63% | Cl calc. 19.31% |
| found 59.4 % | found 5.8 % | found 7.2 % | found 19.2 % |
| O calc. 8.71% | | | |
| found 8.3 % | | | |

EXAMPLE 3

5.0 g of 3-phenyl-4,6-dichloro-5-hydroxypyridazine were mixed with 20 g of benzoyl chloride and boiled for 30 minutes under a reflux condenser. The excess acid chloride was distilled off in vacuo and the residue was dissolved in 50 ml of ether, filtered using active charcoal and evaporated.

5.4 g of 3-phenyl-4,6-dichloro-pyridazinyl-(5) benzoate were obtained as a yellow oil, corresponding to a yield of 75.5%.
$n_D^{20} = 1.6205$

| | | | |
|---|---|---|---|
| C calc. 59.15% | H calc. 2.92% | N calc. 8.12% | Cl calc. 20.54% |
| found 60.0 % | found 3.1 % | found 8.0 % | found 20.1 % |
| O calc. 9.27% | | | |
| found 8.8 % | | | |

The following compounds were prepared analogously to Example 3:

3-Phenyl-4,6-dichloro-pyridazinyl-(5) n-hexanoate
68% yield
$n_D^{20} = 1.5510$

| | | | |
|---|---|---|---|
| C calc. 56.65% | H calc. 4.75% | N calc. 8.25% | Cl calc. 20.91% |
| found 57.0 % | found 5.0 % | found 8.0 % | found 20.6 % |
| O calc. 9.43% | | | |
| found 9.5 % | | | |

3-Phenyl-4,6-dichloropyridazinyl-(5) n-octanoate
64.5% yield
$n_D^{20} = 1.5265$

| | | | |
|---|---|---|---|
| C calc. 58.86% | H calc. 5.49% | N calc. 7.63% | Cl calc. 19.31% |
| found 60.0 % | found 5.5 % | found 7.2 % | found 18.5 % |
| O calc. 8.71% | | | |
| found 8.8 % | | | |

3-Phenyl-4,6-dichloro-pyridazinyl-(5) decanoate
73% yield
$n_D^{20} = 1.5270$

| | | | |
|---|---|---|---|
| C calc. 60.76% | H calc. 6.12% | N calc. 7.09% | Cl calc. 17.94% |
| found 61.2 % | found 6.2 % | found 6.7 % | found 17.2 % |
| O calc. 8.09% | | | |
| found 9.0 % | | | |

3-Phenyl-4,6-dichloro-pyridazinyl-(5) heptanoate
85% yield
$n_D^{20} = 1.5530$

| | | | |
|---|---|---|---|
| C calc. 57.80% | H calc. 5.14% | N calc. 8.16% | Cl calc. 20.08% |
| found 58.0 % | found 5.3 % | found 8.0 % | found 19.8 % |
| O calc. 9.06% | | | |
| found 9.0 % | | | |

EXAMPLE 4

5.0 g of 3-phenyl-4,6-dichloro-5-hydroxypyridazine and 20 g of n-butyric acid anhydride were boiled for 4 hours under a reflux condenser. The excess butyric acid anhydride and the butyric acid were distilled off in vacuo, the residue was stirred with 50 ml of petroleum ether and filtered using active charcoal, and the petroleum ether was distilled from the filtrate.

4.6 g of yellow oil were left, corresponding to a 71% yield of 3-phenyl-4,6-dichloro-pyridazinyl-(5) n-butanoate.

EXAMPLE 5

5.0 of 3-phenyl-4,6-dichloro-5-hydroxypyridazine and 20 g of caprylic acid anhydride were heated to 180°–200°C for 1.5 hours. The excess acid anhydride and the acid were distilled off in vacuo, the residue was stirred with 50 ml of petroleum ether and filtered using active charcoal, and the filtrate was evaporated. 5.8 g of yellow oil were left, corresponding to a 74.5% yield of 3-phenyl-4,6-dichloropyridazinyl-(5) n-octanoate.
$n_D^{20} = 1.5265$

| | | | |
|---|---|---|---|
| C calc. 58.86% | H calc. 5.49% | N calc. 7.63% | Cl calc. 19.31% |
| found 60.0 % | found 5.5 % | found 7.2 % | found 18.5 % |
| O calc. 8.71% | | | |
| found 8.8 % | | | |

EXAMPLE 6

6.0 g of 3-phenyl-4,6-dichloro-5-hydroxypyridazine, 6.0 g of myristic acid chloride and 4 ml of xylene were mixed and boiled for 6 hours under a reflux condenser. The mixture was then evaporated in vacuo, the residue was stirred with 50 ml of petroleum ether and filtered using active charcoal, and the filtrate was then evaporated. 5.6 g of a red viscous oil were left, corresponding to a 50% yield of 3-phenyl-4,6-dichloro-pyridazinyl-(5) myristic acid ester.

| C calc. 64.17% | H calc. 7.14% | N calc. 6.21% | Cl calc. 15.71% |
|---|---|---|---|
| found 64.2 % | found 7.3 % | found 6.0 % | found 15.5 % |
| O calc. 7.09% | | | |
| found 7.2 % | | | |

EXAMPLE 7

5.0 g of 3-phenyl-4,6-dichloro-5-hydroxypyridazine, 6.5 g of stearic acid chloride and 3.0 ml of xylene were mixed and boiled for 8 hours under a reflux condenser. The mixture was evaporated in vacuo and the residue was dissolved in 70 ml of benzene, filtered using charcoal and evaporated.

8.4 g of a crystalline product were left, corresponding to an 80% yield of 3-phenyl-4,6-dichloro-pyridazinyl-(5) stearate. Melting point: 36°–39°C.

| C calc. 66.26% | H calc. 7.94% | N calc. 5.52% | Cl calc. 13.97% |
|---|---|---|---|
| found 67.0 % | found 8.3 % | found 5.0 % | found 13.0 % |
| O calc. 6.31% | | | |
| found 6.7 % | | | |

EXAMPLE 8

5.0 g of 3-phenyl-4,6-dichloro-5-hydroxypyridazine and 20 ml of β-chloropropionyl chloride were boiled for 4 hours under a reflux condenser. The acid chloride was distilled off in vacuo and the residue was stirred with 50 ml of benzene, filtered using charcoal and evaporated.

4.9 g of a viscous red oil were left, corresponding to a 71% yield of 3-phenyl-4,6-dichloro-pyridazinyl-(5) β-chloropropionate.

| C calc. 47.08% | H calc. 2.74% | N calc. 8.45% | Cl calc. 32.08% |
|---|---|---|---|
| found 48.0 % | found 3.0 % | found 8.0 % | found 31.5 % |
| O calc. 9.65% | | | |
| found 9.3 % | | | |

EXAMPLE 9

207 g of 3-phenyl-4,6-dichloro-5-hydroxypyridazine were suspended in 1,800 g of benzene, 91 g of triethylamine were added and the mixture was stirred for 15 minutes. A solution of 122 g of oenanthic acid chloride in 360 g of benzene was then added rapidly and the whole was stirred for 30 minutes.

400 ml of water were then added, the mixture was stirred for 5 minutes, the aqueous phase was separated off and the benzene solution was dried with $Na_2SO_4$, filtered and evaporated in vacuo.

190 g of 3-phenyl-4,6-dichloropyridazinyl-(5) heptanoate were left as a light yellow oil, corresponding to 63% yield.

$n_D^{20} = 1.5530$.

EXAMPLE 10

20 g of 3-phenyl-4,6-dichloro-pyridazinyl-(5) n-octanoate were dissolved in 50 ml of acetone, this solution was sprayed onto 70 g of Attaclay (aluminium magnesium silicate) and the acetone was allowed to evaporate off, 10 g of sodium oleyl-methyl-tauride were added and the whole was mixed and ground in a mechanical grinder-mixer device, until a homogeneous dust of the desired particle size was obtained. The spray liquor obtained by stirring the formulation into an appropriate amount of water was applied to the plants by spraying.

EXAMPLE 11

20 g of 3-phenyl-4,6-dichloro-pyridazinyl-(5) n-octanoate, 70 ml of xylene and 10 g of alkylarylsulphonate mixed with polyoxyethylene-sorbitane-tall oil ester were mixed; the emulsion concentrate thereby obtained, when stirred into the amount of water required for application to the plant, gave a stable emulsion.

EXAMPLE 12

50 g of 3-phenyl-4,6-dichloro-pyridazinyl-(5) n-hexanoate, 40 ml of xylene and 10 g of alkylarylsulphonate mixed with polyoxyethylene-sorbitane-tall oil ester were mixed; the emulsion concentrate thereby obtained, when stirred into the amount of water required for application to the plants, gave a stable emulsion.

EXAMPLE 13

The following weeds grown in a greenhouse:

| *Erodium cicutarium* | stork's bill |
| *Centaurea jacea* | meadow knapweed |
| *Lapsana communis* | nipplewort |
| *Galium aparine* | cleavers |
| *Matricaria chamomilla* | camomile |
| *Lamium purpureum* | deadnettle |
| *Veronica hederaefolia* | speedwell |
| *Galeopsis tetrahit* | hemp-nettle | were sprayed with a suspension of the compounds according to the invention after the weeds had reached the four to six leaf stage. The spraying solution was prepared by suspending a wettable powder, consisting in each case of 20% by weight of the active substance in question, 70% by weight of kaolin and 10% by weight of the dispersing agent sodium oleyl-methyl-tauride. The compounds according to the invention which have an ester structure were used in the form of emulsion concentrates.

The dosage corresponded to 5.0 kg and 1.4 kg of the active compound per hectare.

14 days after the treatment, the herbicidal effect on the weeds was determined in accordance with the E.W.R.C. rating scheme (E.W.R.C. = European Weed Research Council). The ratings 1 to 9 correspond to the following proportions of destruction:

| Rating of the Herbicidal Action | Corresponding to % Destruction of the Weeds |
|---|---|
| 1 | 100 |
| 2 | 97.5 |
| 3 | 95 |
| 4 | 90 |
| 5 | 85 |
| 6 | 75 |
| 7 | 65 |
| 8 | 32.5 |
| 9 | 0 | were sprayed with the suspension, described in Example 13, of the compounds according to the invention. At the time of treatment, the varieties of cereal, maize and rice had formed three leaves and the sugar beets, horse beans, radishes and cucumbers had developed the cotyledons or the primary leaves and the first genuine foliage leaf pair. Red clover was treated after the first trifoliate leaf had developed. The dosage corresponded to 1.4 kg and 5 kg of active substance/hectare.

14 days after the treatment the degree of damage to the crop plants was determined in accordance with the following scheme:

Herbicidal Action on Various Weeds

| Weeds | Erodium cicutarium | | Centaurea jacea | | Lapsana communis | | Galium aparine | | Matricaria chamomilla | | Lamium purpureum | | Veronica hederaefolia | | Galeopsis tetrahit | | |
|---|---|---|---|---|---|---|---|---|---|---|---|---|---|---|---|---|---|
| Active Compounds | 1.4 | 5 | 1.4 | 5 | 1.4 | 5 | 1.4 | 5 | 1.4 | 5 | 1.4 | 5 | 1.4 | 5 | 1.4 | 5 | kg/ha |
| Py ethyl-hexanoate | 8 | 6 | 8 | 6 | 5 | 1 | 1 | 1 | 6 | 2 | 7 | 3 | 3 | 1 | 7 | 2 | |
| Py n-butanoate | 1 | 1 | 1 | 1 | 1 | 1 | 1 | 1 | 1 | 1 | 1 | 1 | 1 | 1 | 1 | 1 | |
| Py n-hexanoate | 1 | 1 | 1 | 1 | 1 | 1 | 1 | 1 | 1 | 1 | 1 | 1 | 1 | 1 | 1 | 1 | |
| Py n-heptanoate | 1 | 1 | 1 | 1 | 1 | 1 | 1 | 1 | 1 | 1 | 1 | 1 | 1 | 1 | 1 | 1 | |
| Py n-octanoate | 1 | 1 | 1 | 1 | 1 | 1 | 1 | 1 | 1 | 1 | 1 | 1 | 1 | 1 | 1 | 1 | |
| Py n-decanoate | 1 | 1 | 1 | 1 | 1 | 1 | 1 | 1 | 1 | 1 | 1 | 1 | 1 | 1 | 1 | 1 | |
| Py benzoate | 1 | 1 | 2 | 1 | 1 | 1 | 3 | 1 | 3 | 2 | 2 | 1 | 1 | 1 | 3 | 1 | |

Example 13: Herbicidal action in ratings 1 – 9 according to the E.W.R.C. scheme
Py = 3-Phenyl-4,6-dichloro-pyridazinyl-(5)

EXAMPLE 14

The following crop plants grown in a greenhouse:

| | |
|---|---|
| Triticum vulgare | Wheat |
| Hordeum sativum | Barley |
| Avena sativa | Oats |
| Secale cereale | Rye |
| Zea mays | Maize |
| Oryza sativa | Rice |
| Vicia faba | Horse bean |
| Trifolium pratense | Red clover |
| Beta vulgaris | Sugar beet |
| Raphanus sativus var.radicula | Radish |
| Cucumis sativa | Cucumber |

| Rating of Damage to the Crop Plant | Corresponding to % Thinning-out or Scorching or Inhibition of Growth |
|---|---|
| 1 | 0 |
| 2 | 2.5 |
| 3 | 5 |
| 4 | 10 |
| 5 | 15 |
| 6 | 25 |
| 7 | 35 |
| 8 | 67.5 |
| 9 | 100 |

Action on Crop Plants

| Crop Plants | Triticum vulgare | | Hordeum sativum | | Avena sativa | | Secale cereale | | Zea mays | | Vicia faba | | Trifolium pratensis | | Beta vulg. | | Oryza sativa | | Raphanus sat. var. r. | | Cucumis sativa | | |
|---|---|---|---|---|---|---|---|---|---|---|---|---|---|---|---|---|---|---|---|---|---|---|---|
| Active Compounds | 1.4 | 5 | 1.4 | 5 | 1.4 | 5 | 1.4 | 5 | 1.4 | 5 | 1.4 | 5 | 1.4 | 5 | 1.4 | 5 | 1.4 | 5 | 1.4 | 5 | 1.4 | 5 | kg/ha |
| Py ethyl-hexanoate | 1 | 1 | 1 | 1 | 1 | 1 | 1 | 1 | 1 | 1 | 1 | 1 | 3 | 1 | 2 | 2 | 6 | 1 | 1 | 2 | 7 | 6 | 8 |
| Py n-butanoate | 1 | 3 | 1 | 3 | 1 | 3 | 1 | 3 | 1 | 3 | 2 | 4 | 2 | 5 | 3 | 8 | 1 | 1 | 3 | 8 | 7 | 9 | |
| Py n-hexanoate | 1 | 3 | 1 | 3 | 1 | 3 | 1 | 3 | 2 | 3 | 2 | 5 | 2 | 5 | 4 | 8 | 1 | 2 | 3 | 8 | 7 | 9 | |
| Py n-heptanoate | 1 | 2 | 1 | 2 | 1 | 2 | 1 | 2 | 1 | 2 | 3 | 7 | 3 | 7 | 3 | 7 | 1 | 1 | 4 | 7 | 6 | 8 | |
| Py n-octanoate | 1 | 2 | 1 | 2 | 1 | 2 | 1 | 2 | 1 | 2 | 3 | 6 | 3 | 6 | 2 | 6 | 1 | 1 | 3 | 7 | 6 | 8 | |
| Py n-decanoate | 1 | 1 | 1 | 1 | 1 | 1 | 1 | 1 | 1 | 2 | 5 | 2 | 4 | 3 | 6 | 1 | 1 | 3 | 7 | 7 | 9 | | |
| Py benzoate | 1 | 1 | 1 | 1 | 1 | 1 | 1 | 1 | 1 | 1 | 2 | 4 | 2 | 5 | 3 | 6 | 1 | 1 | 3 | 6 | 5 | 7 | |

Example 14: Damage to crop plants in ratings 1 – 9 according to the E.W.R.C. scheme.
Py = 3-Phenyl-4,6-dichloropyridazinyl-(5)

EXAMPLE 15

The results according to the preceding examples show that with a series of compounds, especially the butanoate, n-hexanoate, n-heptanoate, n-octanoate and n-decanoate, of the formula I, the limit of herbicidal activity had not yet been reached if the amount used was 1.4 kg/hectare. These compounds were therefore subjected to a further test using substantially reduced amounts (1.0 and 0.5 kg of active compound/ha). The way in which the experiment was carried out remained the same as described in Example 14.

Herbicidal Action on Various Weeds

| Weeds: | Erodium cicutarium | | Centaurea jacea | | Lapsana communis | | Galium aparine | | Matricaria chamomilla | | Lamium purpureum | | Veronica hederaefol. | | Galeopsis tetrahit | |
|---|---|---|---|---|---|---|---|---|---|---|---|---|---|---|---|---|
| Active Compounds | 1.0 | 0.5 | 1.0 | 0.5 | 1.0 | 0.5 | 1.0 | 0.5 | 1.0 | 0.5 | 1.0 | 0.5 | 1.0 | 0.5 | 1.0 | 0.5 kg/ha |
| Py n-butanoate | 1 | 1 | 2 | 4 | 1 | 1 | 1 | 1 | 1 | 1 | 1 | 1 | 1 | 2 | 1 | 3 |
| Py n-hexanoate | 1 | 1 | 2 | 4 | 1 | 1 | 1 | 1 | 1 | 1 | 1 | 1 | 1 | 2 | 1 | 3 |
| Py n-heptanoate | 1 | 1 | 2 | 3 | 1 | 1 | 1 | 1 | 1 | 1 | 1 | 1 | 1 | 2 | 1 | 2 |
| Py n-octanoate | 1 | 1 | 2 | 4 | 1 | 1 | 1 | 1 | 1 | 1 | 1 | 1 | 1 | 2 | 1 | 2 |
| Py n-decanoate | 1 | 1 | 3 | 5 | 1 | 1 | 1 | 1 | 1 | 1 | 1 | 2 | 2 | 3 | 2 | 3 |

Herbicidal action in ratings 1 – 9 according to the E.W.R.C. scheme
Py = 3-Phenyl-4,6-dichloropyridazinyl As illustrated in the Examples, the use of the compounds of formula (I) leads to complete destruction of all tested weeds even using amounts of only 1.4 kg/hectare. The compounds with ester groups derived from straight-chain aliphatic carboxylic acids with 4 to 10 carbon atoms show a herbicidal activity which is substantially stronger still, so that even at a dosage of 0.5 kg. of active compound/hectare 100% success in combating is achieved with the majority of the weeds tested.

As can be seen from Example 14, a number of crop plants show good to very good toleration of the compounds according to the invention. Crop plants from the group of the grasses, in particular, prove to be largely tolerant, so that the compositions may be used for combating weeds, for example in cereal cultures.

What we claim is:
1. A phenylpyridazine having the formula

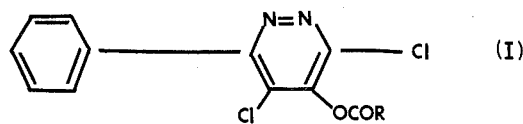

in which R is selected from the group consisting of alkyl having 1 to 20 carbon atoms, β-chloroethyl and phenyl.

2. The phenylpyridazine according to claim 1, 3-Phenyl-4,6-dichloro-pyridazinyl-(5) n-butanoate.

3. The phenylpyridazine according to claim 1, 3-Phenyl-4,6-dichloro-pyridazinyl-(5) n-hexanoate.

4. The phenylpyridazine according to claim 1, 3-Phenyl-4,6-dichloro-pyridazinyl-(5) n-octanoate.

5. The phenylpyridazine according to claim 1, 3-Phenyl-4,6-dichloro-pyridazinyl-(5) n-ethylhexanoate.

6. The phenylpyridazine according to claim 1, 3-Phenyl-4,6-dichloro-pyridazinyl-(5) n-decanoate.

7. The phenylpyridazine according to claim 1, 3-Phenyl-4,6-dichloro-pyridazinyl-(5) myristate.

8. The phenylpyridazine according to claim 1, 3-Phenyl-4,6-dichloro-pyridazinyl-(5) heptanoate.

* * * * *